(12) United States Patent
Lampke et al.

(10) Patent No.: US 7,008,019 B2
(45) Date of Patent: Mar. 7, 2006

(54) HEADREST FOR A SEAT BACK, PARTICULARLY A REAR SEAT BACK

(75) Inventors: Ingo Lampke, Stadthagen (DE); Martin Graeper, Hannover (DE); Uwe Lindenberg, Stadthagen (DE)

(73) Assignee: Faurecia Autositze GmbH & Co. KG, (DE)

( * ) Notice: Subject to any disclaimer, the term of this patent is extended or adjusted under 35 U.S.C. 154(b) by 90 days.

(21) Appl. No.: 10/809,012

(22) Filed: Mar. 25, 2004

(65) Prior Publication Data

US 2004/0217641 A1 Nov. 4, 2004

(30) Foreign Application Priority Data

Apr. 29, 2003 (DE) ................................ 103 19 453

(51) Int. Cl.
*B60N 2/48* (2006.01)

(52) U.S. Cl. .................. 297/408; 297/216.12; 297/410

(58) Field of Classification Search ................ 297/408, 297/410, 216.12
See application file for complete search history.

(56) References Cited

U.S. PATENT DOCUMENTS

| 3,307,874 | A | * | 3/1967 | Wilson | 297/410 |
| 5,669,666 | A | * | 9/1997 | Lee | 297/408 |
| 5,669,668 | A | * | 9/1997 | Leuchtmann | 297/408 |
| 5,695,251 | A | * | 12/1997 | Scolari | 297/408 |
| 6,050,633 | A | * | 4/2000 | Droual | 297/408 |
| 6,074,010 | A | * | 6/2000 | Takeda | 297/391 |
| 6,074,011 | A | * | 6/2000 | Ptak et al. | 297/408 |
| 6,129,421 | A | * | 10/2000 | Gilson et al. | 297/408 |
| 6,779,839 | B1 | * | 8/2004 | Andreasson et al. | 297/410 |
| 6,805,411 | B1 | * | 10/2004 | Gramss et al. | 297/408 |

FOREIGN PATENT DOCUMENTS

DE 19645685 C2 11/1996

* cited by examiner

*Primary Examiner*—Peter R. Brown
(74) *Attorney, Agent, or Firm*—Bourque & Associates

(57) ABSTRACT

A headrest for use with a seat back, preferably for a rear seat of an automobile, having a mount operatively attached to the seat back and a headrest pivotably mounted so that it may pivot or swivel forward about a swivel axis. In a use position, a spring places pressure or a load on the headrest, and may be engaged or locked against folding forward because of the spring. When the headrest is lowered below a minimum heigth, the headrest is automatically unlocked or disengaged, and the headrest moves forward generally perpendicular with the seatback under the force of the spring. The mount is adjustable in height, and the headrest is automatically released from the engaged or locked position when the headrest is lowered below a minimum height.

5 Claims, 5 Drawing Sheets

HEADREST FOR A SEAT BACK, PARTICULARLY A REAR SEAT BACK

TECHNICAL FIELD OF THE INVENTION

The invention relates to a headrest for a seat back and more particularly, to a headrest for a seat back that pivots forward with respect to the seat back to preclude a user from using it when the headrest is placed below a minimum height.

DESCRIPTION OF THE RELATED ART

DE 196 45 685 C2 discloses a seat back for a front seat having a foldable rear seat. The headrest is also foldable, and is affixed to the rear seat back so that its height is not adjustable.

The problem with adjustable headrests is that the seat user often adjusts the headrest too low. This results in the headrest not functioning in the planned and desired manner during a crash. A headrest setting that is too low is often found on rear seat backs. One possible reason for the seat back headrest being set too low is that it allows the driver a better rearward view.

Another possible reason that rear seat headrests are adjusted too low is that most rear seat backs will not fold forward (e.g., to provide expanded luggage space) without forward (e.g., to provide expanded luggage space) without hitting the backs of the front seat backs unless the headrests are in the lowest position. It is hazardous to drive with a headrest that is set too low.

SUMMARY OF THE INVENTION

The present invention is a seat back of the conventional type with a height-adjustable headrest in which the maintenance of a minimum height is ensured, because when the headrest is below the minimum height, the seat becomes practically not useable. The present invention is a headrest for use with a seat back of an automobile, including: a mount having a first end operatively attached to a top portion of the seat back, and wherein the headrest is pivotably mounted to a distal end of the mount and pivots about a swivel axis; a spring operatively mounted to the headrest, and for applying a pressure against the headrest when the headrest is folded toward the seatback into engagement and in a "use" position; and wherein said headrest is pivoted out of engagement and about the swivel axis to tilt the headrest forward against the pressure of the spring when the headrest is lowered below a minimum height.

The present invention is a seat back that allows the headrest to be stored in a lowered position, which is useful because this allows better rearward visibility when the seat is not occupied or folded forward; however, it is ensured that the seat is not useable if the headrest is set below a minimum height.

BRIEF DESCRIPTION OF THE DRAWINGS

These and other features and advantages of the present invention will be better understood by reading the following detailed description, taken together with the drawing wherein.

DETAILED DESCRIPTION OF THE PREFERRED EMBODIMENTS

Figure 1:
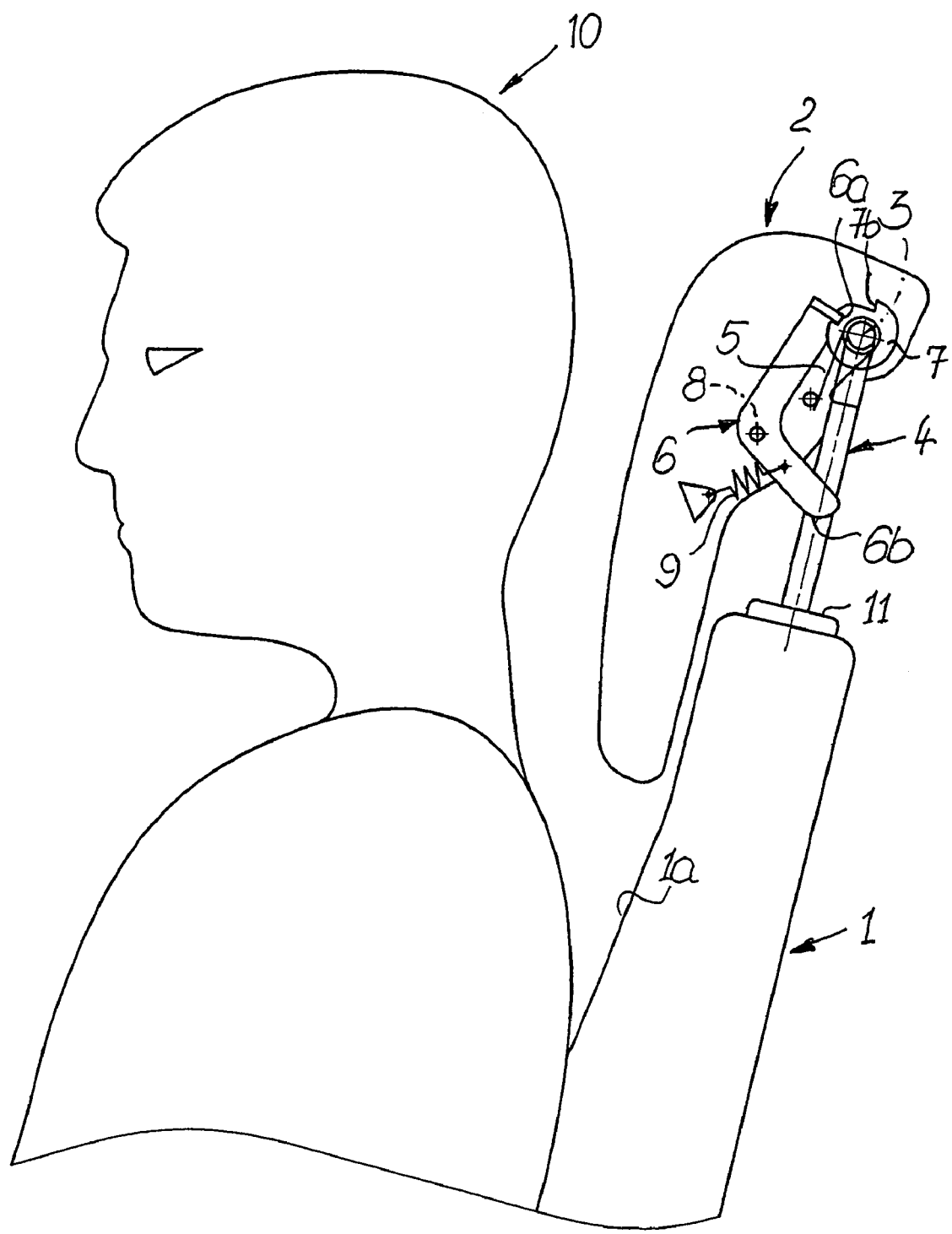
FIG. 1 is a side view of an upper area of a seat back with a headrest in a conventional height adjustment.

FIG. 1 shows a headrest 2 for a seat back 1 according to the present invention. The headrest 2 is connected to the seat back 1 by a mount 4. A first end of the mount 4 is operatively mounted to the seat back 1, and the mount 4 extends from the seat back 1. The headrest 2 is operatively and rotatably attached to a distal end of the mount 4 and may tilt or pivot about a horizontal swivel axis 3. For illustration purposes, a head 10 of a user is also shown.

The mount 4 is height-adjustable, and may, for example, include two rods or mounts 4 positioned parallel to each other between the seat back 1 and headrest 2 in a conventional manner and extending through bushings (shown generally at 11) positioned in the seat back 1.

Figure 2:
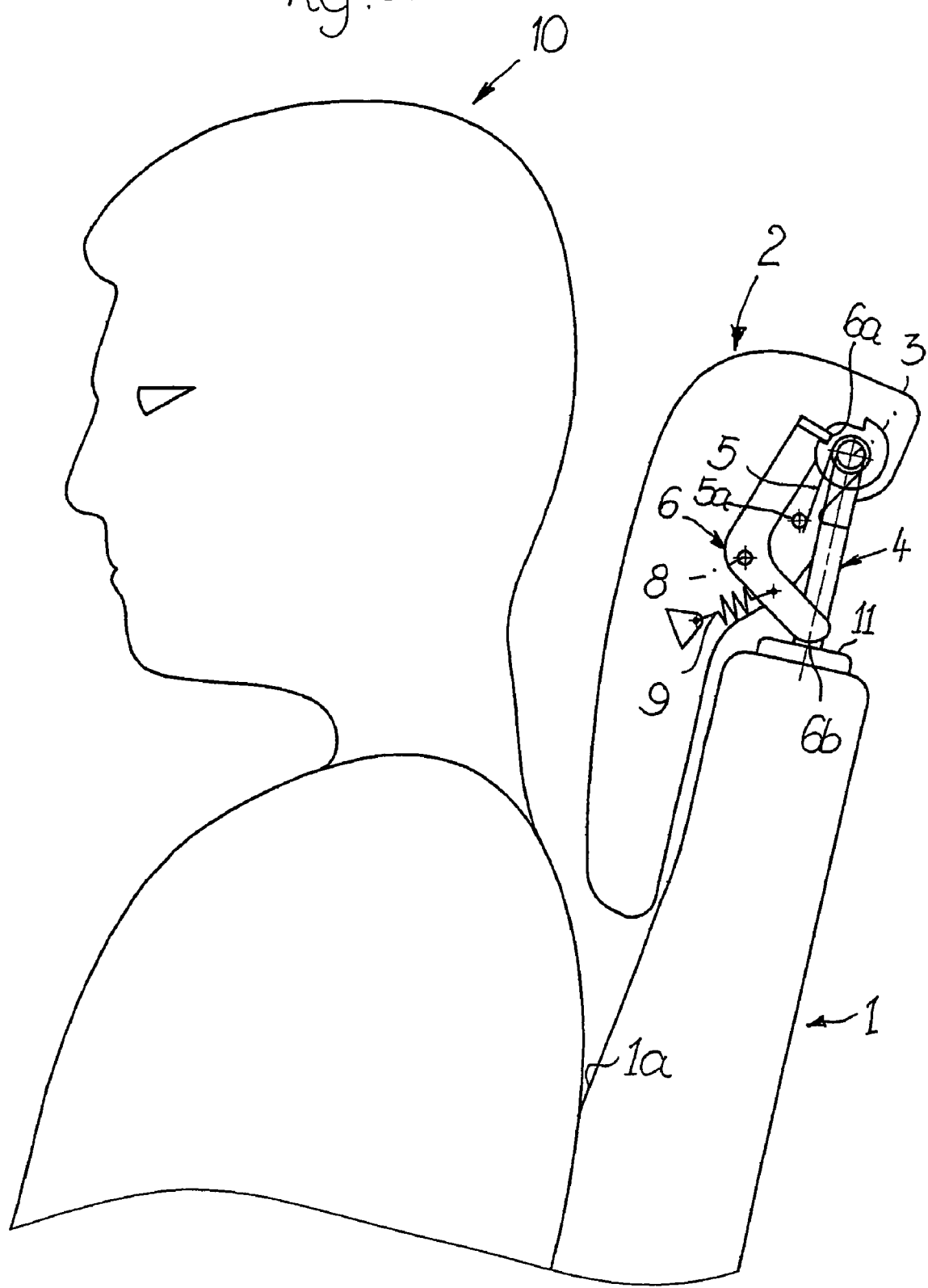
FIG. 2 is a side view according to FIG. 1 but with the headrest set in a lower useable position.

The headrest 2 is supported and is pivotably mounted to the one or more mounts 4 such that it can be tilted or pivoted about the horizontal swivel axis 3. An engaging element 7 is positioned on the distal end of the mount 4, wherein the engaging element 7 includes an engagement recess 7a and a stop 7b, FIG. 4. A spring 5, preferably a leg spring, is mounted concentric with the horizontal swivel axis 3, with a first leg resting on or in contact with the mount 4 and a second leg pressing against a loading spring or region 5a, e.g., a bushing affixed to the headrest 2, FIG. 2.

Figure 3:
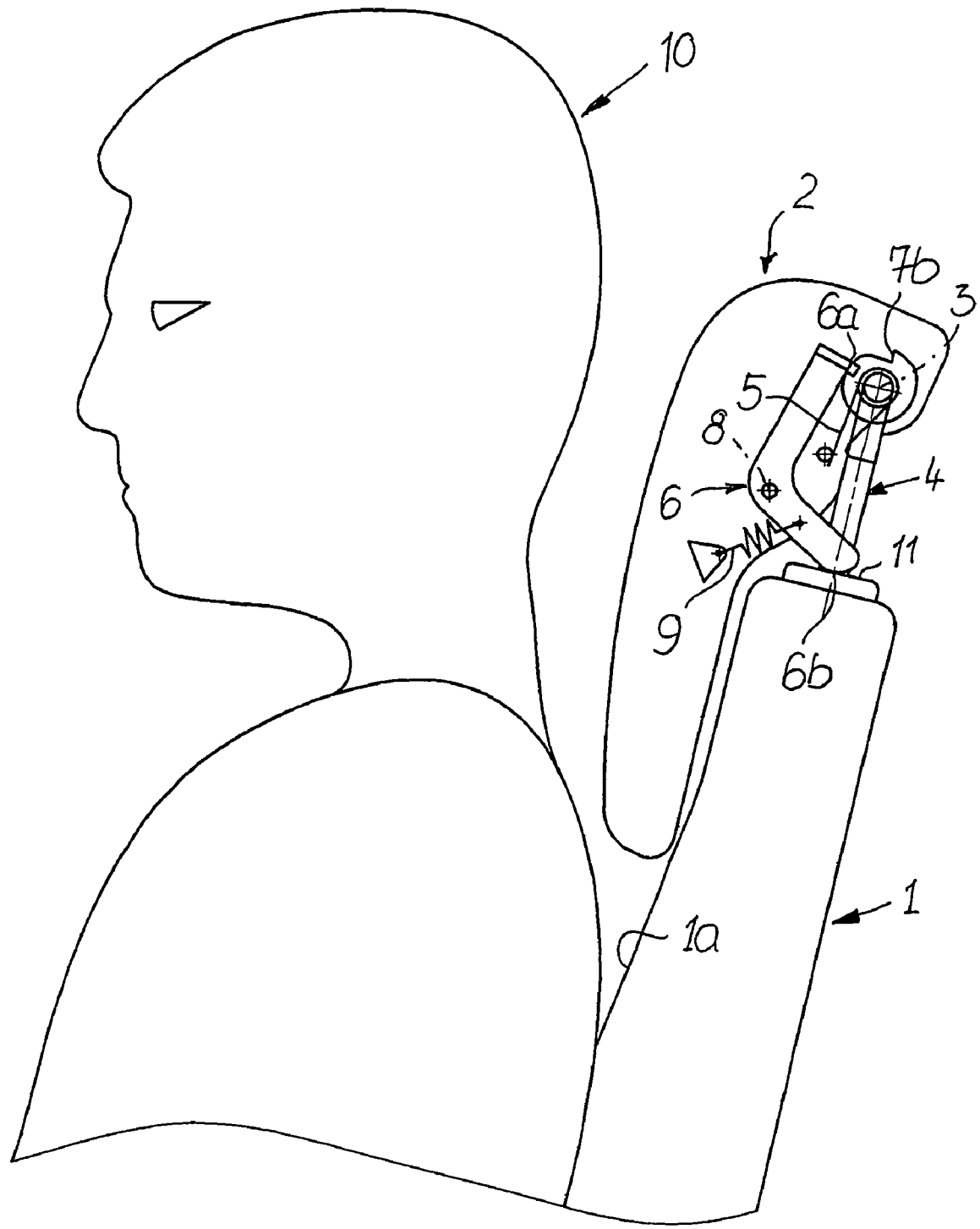
FIG. 3 is a side view according to FIGS. 1 and 2 in a lower release position at which the mechanism of the present invention causes the headrest to begin to fold forward.
Figure 4:
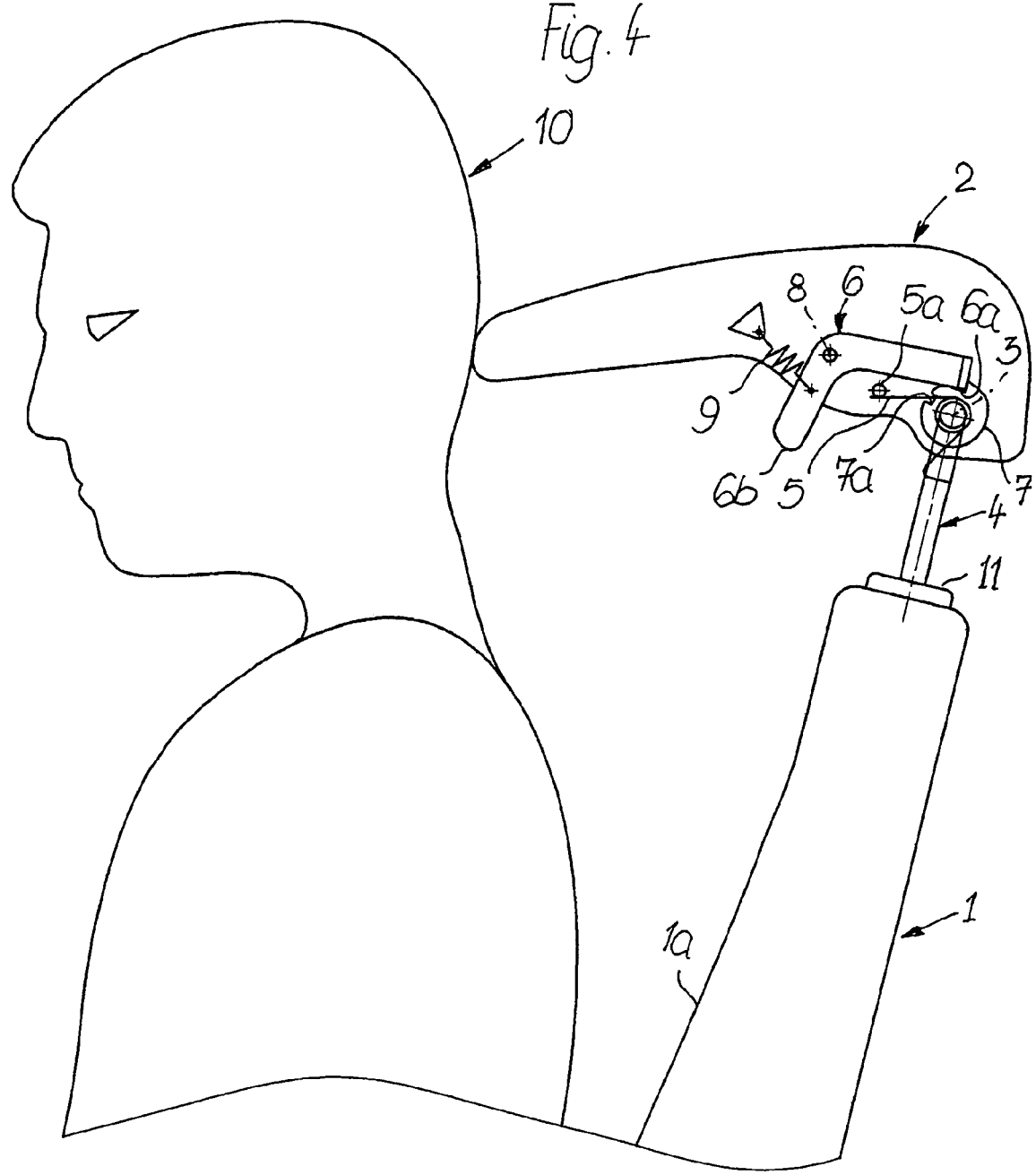
FIG. 4 is a side view according to FIG. 3 with headrest folded forward.

An adjustment lever 6 is operatively and rotatably mounted to the headrest 2 on a swivel axis 8. The adjustment lever 6 is, preferably, an angled lever and has a first area 6a on an upper end and a second area 6b on a lower end. The adjustment lever 6 is attached or affixed to a tension spring 9 so that the first area 6a is held in the engagement recess 7a as long as the mount 4 has adequate height for use or is above a minimum height. However, when the mount 4 is lowered to the minimum height or below, the second area 6b of the adjustment lever 6 reaches or contacts a contact area 11, FIG. 3, that is affixed or attached to the seat back 1, and the adjustment lever 6 pivots or swivels counter-clockwise such that the first area 6a moves out of the engagement recess 7a and into engagement with the stop 7b. As the first area 6a of the adjustment lever 6 moves from the engagement recess 7a and is released, the spring 5 pivots or swivels the headrest 2 in a clockwise direction to an approximately perpendicular position with respect to the seat back 1 as shown in FIG. 4. In this strike or upward tilt position, the first area 6a of the adjustment lever 6 rests against the stop 7b of the engaging element 7 connected firmly to the mount 4. With the headrest 2 in the strike or upward tilt position, an end of the headrest 2 previously resting below extends toward the user's head 10 such that the user must maintain a considerable distance from a resting surface 1a of the seat back 1, thereby making the seat back 1 practically impossible to use.

Figure 5:
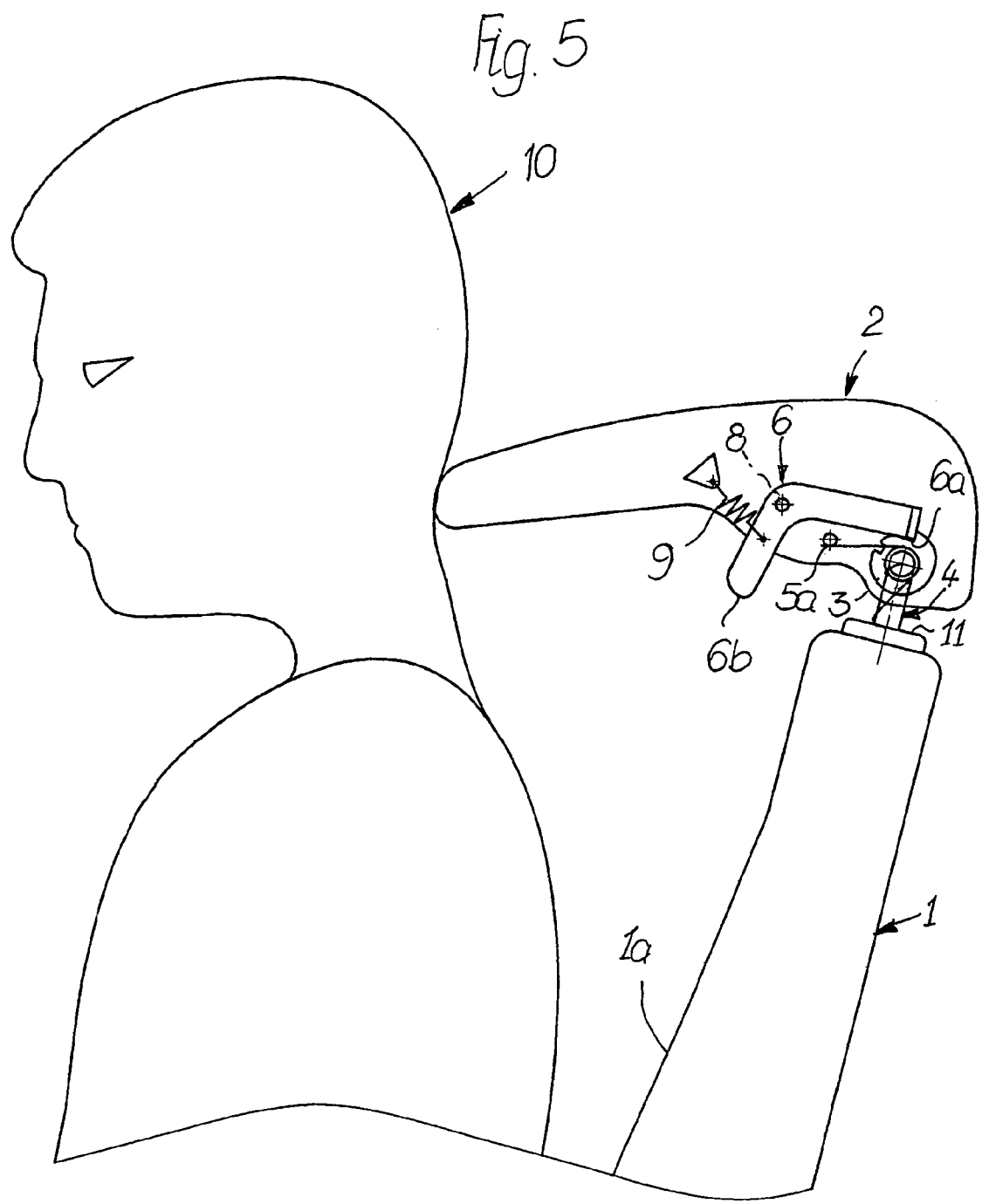
FIG. 5 is a side view according to FIG. 4 with the headrest folded forward but with the headrest in a lower position than that shown in FIG. 4.

FIG. 4 shows the headrest 2 in the folded forward position, and FIG. 5 shows the headrest 2 in the folded forward position also but in a position lower than that shown in FIG. 4. This further lowered position, FIG. 5, leads to an even better rearward view, and allows the seat back 1 to be swiveled into an almost vertical position even when the front seat is positioned to the rear.

In order to attain the initial or "use" position, the headrest 2 is pulled up manually and swiveled in the counter-clockwise direction until the first area 6a of the adjustment lever 6 has again moved or dropped into the engagement recess 7a of the engaging member 7, which is due to the action of the spring 9.

Modifications and substitutions by one of ordinary skill in the art are considered to be within the scope of the present invention, which is not to be limited except by the claims, which follow.

What is claimed is:

1. A headrest for use with a seat back of an automobile, comprising:
   a mount having a first and a second end, said first end operatively attached to a top portion of the seat back, and wherein the headrest is pivotably mounted to said second end of the mount and pivots about a swivel axis;
   a spring operatively mounted to the headrest, and for applying a pressure against the headrest when the headrest is folded toward and generally parallel with the seatback into engagement and in a "use" position, wherein said headrest is pivoted out of engagement and about the swivel axis to tilt the headrest forward and generally perpendicular with the seatback against the pressure of the spring when the headrest is lowered below a minimum height; and
   an adjustment lever having a first area at a first end, a second area at a second end, and an angled lever which may be swiveled about a lever axis parallel to the swivel axis of the headrest, whereby when the adjustment lever is in an alternate position, the first area of the adjustment lever disengages from an engagement recess, and the headrest is positioned in a forward-most position generally perpendicular with the seatback when the adjustment lever engages a stop.

2. The headrest for use with the seat back according to claim 1, wherein the spring is a leg spring operatively mounted concentric to the swivel axis.

3. The headrest for use with the seat back according to claim 2, further including a second spring between the first area of the adjustment lever and the headrest, and wherein the second spring is a tension spring.

4. The headrest for use with the seat back according to claim 3, wherein the headrest is pivotable about the swivel axis when the headrest is lowered or raised with respect to the seatback.

5. The headrest for use with the seat back according to claim 4, wherein the headrest may be further lowered after it has been lowered to a minimum height setting and has been tilted forward.

* * * * *